United States Patent [19]

Ryan et al.

[11] Patent Number: 4,625,934
[45] Date of Patent: Dec. 2, 1986

[54] AIRPLANE SEAT

[75] Inventors: James M. Ryan, New York; Enrique Alie, Brooklyn, both of N.Y.

[73] Assignee: Falcon Jet Corporation, Teterboro, N.J.

[21] Appl. No.: 655,524

[22] Filed: Sep. 28, 1984

[51] Int. Cl.[4] ............................................. B64D 11/06
[52] U.S. Cl. ................................ 244/122 R; 297/330; 297/344
[58] Field of Search ......................... 244/122 R, 118.6; 297/344, 349, 330, 284, 417, 408

[56] References Cited

U.S. PATENT DOCUMENTS

| | | |
|---|---|---|
| 1,918,261 | 7/1933 | Gilch . |
| 2,201,839 | 5/1940 | Van Hoesen ...................... 297/349 |
| 2,332,841 | 10/1943 | Burton et al. . |
| 2,523,960 | 9/1950 | Liljengren et al. . |
| 2,627,894 | 2/1953 | Herider et al. . |
| 2,655,981 | 10/1953 | Whittingham et al. . |
| 2,799,321 | 7/1957 | Liljengren et al. . |
| 2,871,913 | 2/1959 | Appleton . |
| 3,480,240 | 11/1969 | Del Guidice . |
| 3,594,037 | 7/1971 | Sherman . |
| 3,622,202 | 11/1971 | Brown ................................. 297/344 |
| 4,386,803 | 6/1983 | Giderbloom ........................ 297/330 |
| 4,432,583 | 2/1984 | Russo et al. ........................ 297/330 |
| 4,440,441 | 4/1984 | Marrujo et al. . |
| 4,452,485 | 6/1984 | Schuster ............................. 297/284 |
| 4,467,252 | 8/1984 | Takeda et al. ...................... 297/330 |

FOREIGN PATENT DOCUMENTS 1237033 6/1971 United Kingdom .

OTHER PUBLICATIONS

P. L. Porter Company, "Controls" published Aug. 1977.
P. L. Porter Company, "Mechanical Locks" published Oct. 1977.
P. L. Porter Company—(published at least as early as Aug. 1982).
Custom Products Company (published approximately 1982).

Primary Examiner—Galen Barefoot
Attorney, Agent, or Firm—Morgan & Finnegan

[57] ABSTRACT

There is disclosed an airplane seat having a base member provided with a pair of tracks located on the bottom thereof which cooperate with a pair of tracks located on the floor of an airplane fuselage and which moves in a fore and aft direction. Located above the base member is an adjustable seat base and adjustable back member pivotally joined thereto. The seat base is connected through a shaft which cooperates with a clutch located in an opening in the top of the base and which permits universal movement of the seat base in fore, aft and lateral directions independently of the movement of the base member in a fore and aft direction. The seat is provided with a pair of adjustable arm rests, as well as being provided with adjusting linkage to raise and lower the leading edge of the seat base and the curvature of the front surface of the back member and linkage for adjusting the vertical position of the back member with respect to its relationship with the seat base, and the necessary controls for carrying out the various adjustments located on the arm rests.

12 Claims, 4 Drawing Figures

AIRPLANE SEAT

BACKGROUND OF THE INVENTION

This invention relates to seat structures. More particularly, the invention relates to seating structures for aircraft.

Due to the unique environment in which they are used, aircraft seat structures must meet a number of requirements. For example, such seat structures must satisfy government regulations involving aircraft safety. In addition, aircraft seat structures must meet relatively rigid weight guidelines in order to provide satisfactory economical operation of an airplane in which they are used while, at the same time, occupying a minimum of space and still providing maximum passenger comfort and convenience.

Due to the peculiar requirements of seating structures employed in aircraft, research and development has resulted in the provision of a wide variety of seating structures suitable for aircraft use. For example, U.S. Pat. No. 2,332,841 discloses a berth and chair arrangement in which aircraft seats disposed in tandem and having adjustable back and seat members and arm rests are employed in pairs to form berths. In addition, U.S. Pat. No. 1,918,261 discloses a convertable chair with foldable arm rests and a back member which reclines to form a bed or cot. On the other hand, U.S. Pat. No. 2,655,981 discloses an adjustable pilot chair which is movable in a fore and aft direction on a pair of tracks and provided with an adjustable seat, back rest and arm rests. Still another aircraft seat assembly is disclosed in U.S. Pat. No. 3,480,240 in which both fore and aft tracking and lateral tracking are employed in order to change the position of the seat location in the fuselage.

Now, while known prior developments, such as those mentioned above, have enjoyed acceptance in the aircraft industry, there still exists a need for further improvements in seating structures to be employed in airplanes. The present invention fulfills this need.

BRIEF SUMMARY OF THE INVENTION

In accordance with the present invention there is provided an airplane seat comprising in combination, a base member having a pair of tracks located on the bottom thereof cooperating with a pair of tracks fixed to the floor of an airplane fuselage and adapted to move in a fore and aft direction, an opening in the top of the base member, means located in the opening adapted to move universally in fore, aft and lateral directions therein, an adjustable, generally horizontally disposed seat base located above the base member, a vertically disposed shaft fixed to the bottom of the seat base and to the means located in the opening of the base member adapted to rotate the seat with respect to the base member and permit movement of the seat base universally in fore, aft and lateral directions independently of movement of the base member on the tracks fixed to the floor of the fuselage, an adjustable, generally vertically disposed back member cooperatively and pivotally joined to the seat base, a pair of arm rests disposed along the sides of the seat base and forward of the back member, adjusting means located on the seat base adapted to lower and raise the leading edge thereof with respect to its generally horizontal disposition, adjusting means located in the back member adapted to adjust the curvature of the front surface thereof, means for adjusting the vertical position of the back member with respect to its disposition with the seat base located on the seat base and, optionally, at least one adjustable head rest disposed on the uppermost edge of the back member.

BRIEF DESCRIPTION OF THE DRAWINGS

In order to understand the present invention more fully, reference is directed to the accompanying Drawings which are to be taken in conjunction with the description of the invention set forth in detail hereinbelow and in which Drawings.

DESCRIPTION OF THE PREFERRED EMBODIMENTS

Figure 1:
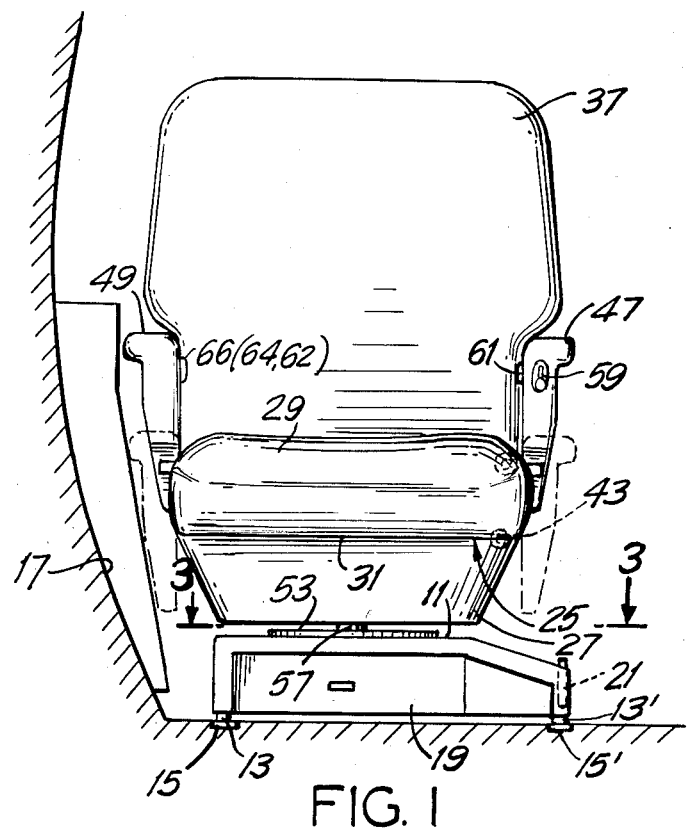
FIG. 1 is a front view in elevation and partially in section of an airplane seat according to the invention showing the seat base, back member, base member and life vest drawer therein, the floor tracking arrangement and floor tracking lever, a pair of adjustable arm rests, the down positions thereof being shown in broken lines and one of which has a single lever control on the foremost face thereof for actuating the universal fore, aft and lateral movement and the rotation of the seat base.
Figure 3:
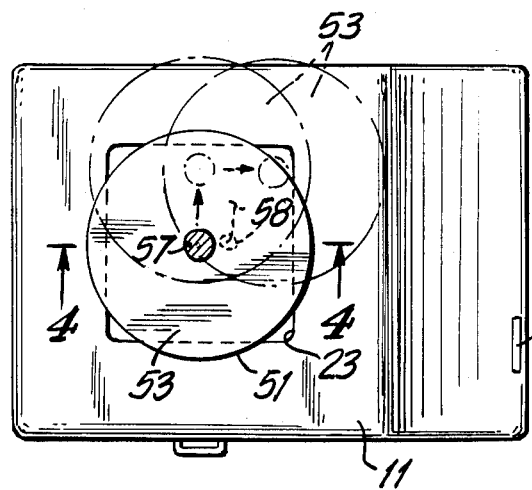
FIG. 3 is a plan view of the base member, taken across Line 3—3 of FIG. 1, showing the opening therein and the means for achieving universal fore, aft and lateral movement and the vertical shaft, in section, for connecting the seat base and the base member to each other.
Figure 2:
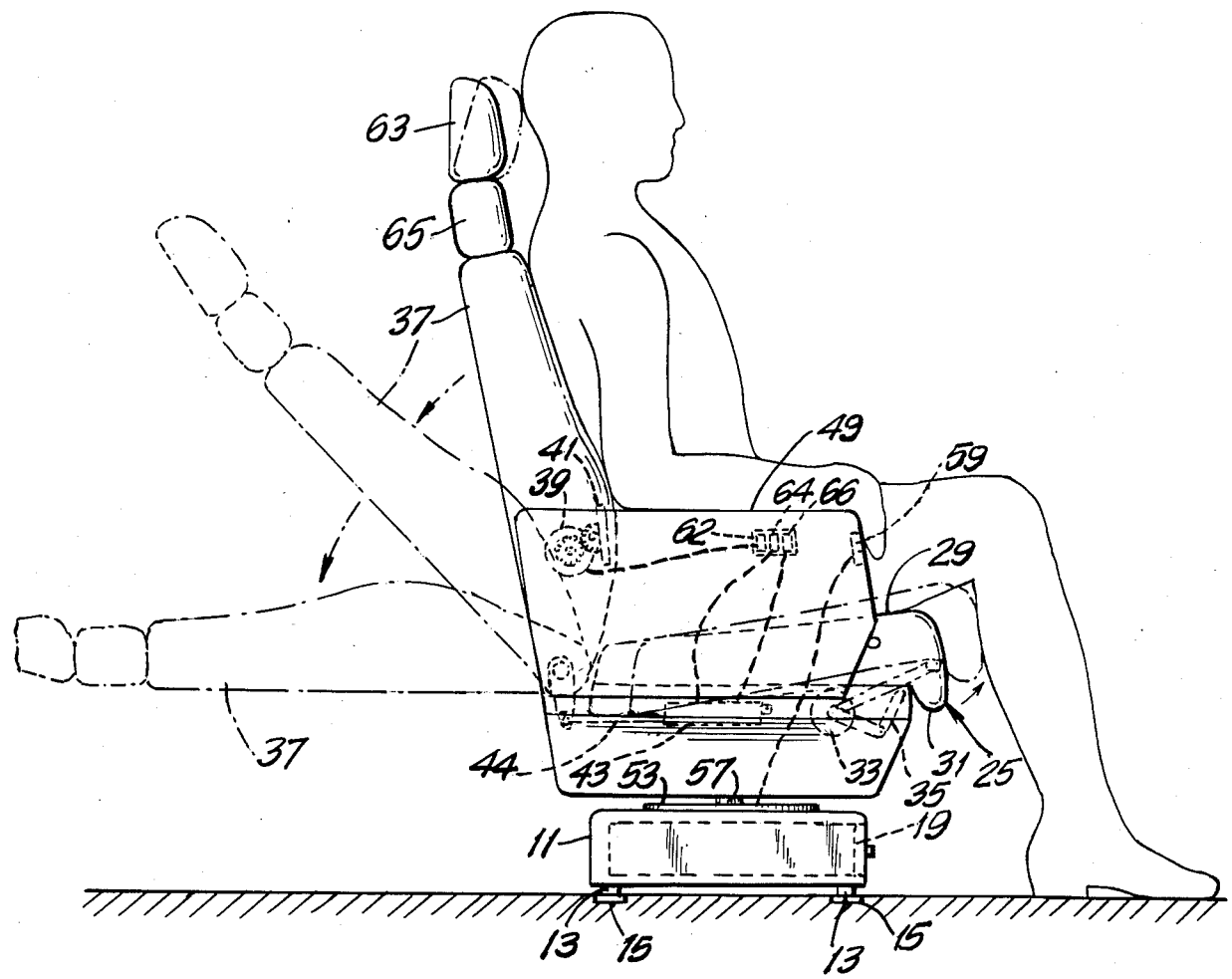
FIG. 2 is a side view of the seat illustrated in FIG. 1 partially in section showing the seat base in normal disposition and in raised position, in broken lines, along with the adjusting and motor means for raising and lowering the seat base, the back member in normal position and in partially depressed and fully depressed positions, in broken lines, along with the adjusting means and motor means for adjusting the front surface thereof along with the switches for actuating the motors located in the arm rest of the seat, and the base member and floor tracking arrangement.

Now, referring more particularly to FIGS. 1 and 2, an airplane seat according to the invention includes as a part of the overall combination a base member 11 provided on its bottom with a pair of tracks 13 and 13' or rollers or the like which cooperate with a pair of tracks 15 and 15' fixed to the floor of an airplane fuselage 17 to permit movement of the seat in a fore and aft direction. The tracks are preferably made of strong, light-weight metal, such as aluminum or a light guage steel or alloys thereof or the like. Base member 11 has a generally rectangular configuration and also may be made from aluminum or light guage steel or alloys thereof or the like or a strong light-weight plastic or the like and is porvided with a drawer 19 for housing a life vest. The tracks are preferably made in segments about 6 inches long in order to provide a reasonable fore and aft movemenet of the airplane seat. Tracks provided on the base member may be made of like length. Base member 11 is also provided with a suitable floor tracking lever 21 on the inboard face thereof. Lever 21 locks the base member 11 in a given position and when actuated permits fore and aft movement of the base. An opening 23, shown in greater detail in FIG. 3 and described more fully hereinbelow, along with its associated elements, is located on the top of base member 11.

Located over base member 11 is an adjustable generally horizontally disposed seat base 25 provided with a generally rectangular lower support member 27 and a body supporting member 29 which is adapted to be raised and lowered along its leading edge 31 by means of a motor 33 and suitable mechanical means 35 fixed to lower support member 27 and attached to the bottom of the body supporting member 29, thus providing thigh adjustment for an individual employing the seat.

Seat base 25 is supported on a suitable seat frame (not shown) employed in the art and which is made of a strong, light-weight metal, such as those mentioned above, or a strong, light-weight plastic and an adjustable generally vertically disposed back member 37 also is pivotally supported on the frame and thus cooperatively joined to the seat base 25.

Back member 37 is provided with a motor 39 and suitable mechanical adjusting means 41 for adjusting the curvature of the front surface thereof, thus providing lumbar support to an individual employing the seat. While the lumbar adjustment may be widely varied in terms of the amount or distance it adjusts the curvature of the surface of back member 37, studies have determined a 1.25 inch high adjustment is generally adequate to provide sufficient lumbar support to an individual of average height, that is in the range of about 5.5 feet to about 6.0 feet. In addition, back member 37 may also be provided with a hydraulic means 43 and appropriate mechanical linkage 45 supported on the seat base, or even on the frame, if desired, so that the back member can be conveniently adjusted to an intermediate or a fully reclining position, thus converting the seat of this invention to a berth or cot. In this connection, a suitable hydraulic means 45, which may be employed, is a seat lock sold by the P. L. Porter Company of Woodland Hills, Calif., 91637, under the registered trade name Hydrolok.

An airplane seat according to this invention is also provided with a pair of arm rests 47 and 49. Both arm rests may be permanently fixed to the seat in any conveniently suitable manner. However, it is preferred that both of the arm rests be adjustable vertically, the vertical movement thereof being accomplished by appropriate tracking which may be disposed on the interior of the inboard sides of the arm rests facing seat base 25 and which are mounted for vertical movement on pins (not shown) which may be fixed to the seat and also locked in their up or down positions by appropriate locking means (not shown). Alternatively, one of the arm rests may be fixed and the other movable vertically or one may be movable vertically while the other, preferably the outboard arm rest, may be removably fixed to the seat.

Figure 4:
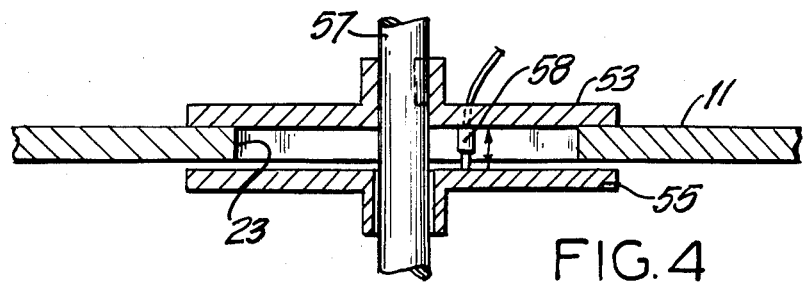
FIG. 4 is a partial view in elevation and in section taken across Lines 4—4 of FIG. 3 showing in detail the base member and opening therein and means for achieving universal fore, aft and lateral movement.

Seat base 25 is adapted to move universally in fore, aft and lateral directions independently of the fore and aft movement of base member 11. In order to accomplish such universal, independent movement of seat base 25 in accordance with this invention, as well as to provide a physical link between seat base 25 and base member 11, there is provided clutch means 51 adapted to move universally in fore, aft and lateral directions in the opening 23 of base member 11, as may be seen more particularly in FIGS. 3 and 4. Clutch means 51 is provided with clutch plates 53 and 55 disposed just above and just below opening 23.

Clutch plates 53 and 55 are mounted on one end of a vertically extending shaft 57 which is fixed at its opposite end to the bottom of the lower support member 27 of seat base 25. Clutch plates 53 and 55 are keyed to shaft 57 so that they move axially thereon and are provided with means, such as springs (not shown) to hold them in an engaged position against the upper and lower surfaces of the top of base member 11, thus preventing universal fore, aft and lateral movement of means 51 in opening 23 and universal movement of the seat. At the same time, the seat is prevented from swiveling or rotating. In addition, means 58, such as Hydrolok hydraulic means 45, mentioned above, may be attached in any convenient manner to clutch plates 53 and 55, and when actuated, will move the clutch plates in an upward and downward direction, respectively, against the urging of the springs mentioned above and away from the upper and lower surfaces of base member 11, thus allowing universal movement in fore, aft and lateral directions of clutch means 51 in opening 23, as well as permitting the seat of this invention to undergo movement in these directions and at the same time to be rotated or swiveled approximately 180° from its usual front-facing position in an aircraft fuselage, all such movements being independent of any fore and aft movement of the base member 11.

It is to be understood that in accordance with this invention the clutch plates 53 and 55 are made in sufficient dimension so that they will not pass through opening 23 of base member 11 when they are undergoing universal movement in fore, aft and lateral directions. In this respect, it is also to be understood that the dimensions of opening 23 of base member 11 will also be made conveniently large so that the greatest fore and aft distance of movement, which is preferably about 6 inches, and the greatest lateral distance of movement, which is preferably about 5 inches, is attained.

It is to be understood that it is also within the purview of this invention to utilize limiting stops or dead end means (not shown) of any convenient kind to limit the fore and aft and lateral movements of the base member and seat base of the airplane seat of this invention.

In accordance with this invention, the arm rests are conveniently utilized for housing the various controls utilized to accomplish the movement in fore, aft and lateral directions of seat base 25, as well as the swiveling or rotation thereof. In this respect, such movements, as well as swiveling or rotation of the airplane seat of this invention are accomplished hydraulically through a single lever control 59 disposed preferably on the forward face of the left arm rest, that is, arm rest 47. In addition, the inclination of the back member 37 of a seat according to this invention is hydraulically operated by suitable linkage 44 and is controlled by a single control lever 61 located on the outboard face of the left arm rest 47. On the other hand, control of the motorized lumbar adjustment of the front surface of the back member, as well as the raising and lowering of the leading edge of the seat base 25 is achieved through suitably disposed switches 62 and 64 located on the interior face of the right arm rest 49.

It is to be understood further that in accordance with this invention an airplane seat may also optionally include a removable adjustable head rest 63, along with an optional removable spacer 65, located on the uppermost edge of the back member.

Still further, an airplane seat in accordance with this invention will be equipped with seat belts (not shown)

which may be attached thereto in any convenient manner in order to meet required government safety regulations.

The unique combination of the above elements of an airplane seat in accordance with this invention also includes a wide variety of aesthetic acoutrements. For example, the seat may be provided with a wide variety of light-weight and comfortable padding, either of foam material or fabric material or other types of padding and in its complete assembly may be covered with a wide variety of decorative fabrics to provide a pleasing aesthetic appearance, as well as to coordinate the seat in terms of color or shade with the overall color scheme of an aircraft in which the seat is employed.

The airplane seat of this invention, due to its unique combination of structural elements, provides numerous advantages. For example, the seat may be made, in part, from light-weight metals, such as high strength aluminum and light guage steel or alloys thereof which will meet the stringent requirements for safety and security required by the Government in aircraft and all of which are available through normal commercial channels. In addition, the various adjustable means may also be made from such materials and light-weight long-life motors to drive the same are readily available through normal commercial channels.

Still further, because of the unique combination of parts and the unique construction of a seat in accordance with this invention, the main elements of the airplane seat can be moved universally in fore, aft and lateral directions independently of the fore and aft movement of the base structure thereof.

Still further, an airplane seat, in accordance with this invention, is readily adaptable to a wide variety of asethetic effects since it may employ a wide variety of readily commercially available paddings and fabric coverings to achieve such effects.

In addition to those various advantages above mentioned, an airplane seat according to this invention provides maximum convenience and comfort to a passenger employing the same while at the same time meeting government safety requirements. Numerous other advantages of an airplane seat in accordance with this invention will be readily apparent to those skilled in the art.

It is to be understood that this invention, in its broader aspects, is not to be limited to the specific embodiments thereof as herein shown and described, but departures may be made therefrom within the scope of the appended claims without departing from the principles of the invention and without sacrificing the chief advantages thereof.

What is claimed is:

1. An airplane seat comprising in combination, a base member having a pair of tracks located on the bottom thereof cooperating with a pair of tracks fixed to the floor of an airplane fuselage and adapted to move in a fore and aft direction, an opening in the top of said base member, clutch means located in said opening adapted to move universally in fore, aft and lateral directions therein, an adjustable, generally horizontally disposed seat base located above said base member, a vertically disposed shaft fixed to the bottom of said seat base and to said clutch means located in said opening and adapted to rotate said seat with respect to said base member and permit movement of said seat base universally in fore, aft and lateral directions independently of the movement of said base member on the tracks fixed to the floor of said fuselage, said clutch means including clutch plates disposed in opposite sides of the opening in said base member and which are keyed on said shaft for axial movement thereon and into and out of contact with the upper and lower surfaces of the top of said base member when in engaged and disengaged positions, respectively, an adjustable, generally vertically disposed back member cooperatively and pivotally joined to said seat base, a pair of arm rests disposed along the sides of said seat base and forward of said back member, adjusting means located on said seat base adapted to lower and raise the leading edge thereof with respect to its generally horizontal disposition, adjusting means located in said back member adapted to adjust the curvature of the front surface thereof and means for adjusting the vertical position of said back member with respect to its disposition with said seat base located on said seat base.

2. An airplane seat according to claim 1 including a floor tracking lever for moving the base member fore and aft along the pair of tracks fixed to the floor of the airplane fuselage.

3. An airplane seat according to claim 1 including a drawer located in the base member for housing a life vest.

4. An airplane seat according to claim 1 including motor means for actuating the adjusting means adapted to lower and raise the leading edge of the seat base.

5. An airplane seat according to claim 1 including motor means for actuating the adjusting means located in the back member to adjust the curvature of the front surface thereof.

6. An airplane seat according to claim 1 including a single lever control disposed on the forward face of one of the arm rests for actuating the universal fore, aft and lateral movement and rotation of the seat base with respect to said base member.

7. An airplane seat according to claim 1 including control means disposed on the interior side of one of the arm rests for actuating the adjusting means located on the seat base to lower and raise the leading edge thereof, for actuating the adjusting means located in said back member to adjust the curvature of the fron surface thereof and for actuating the means for adjusting the vertical disposition of the back member.

8. An airplane seat according to claim 1 in which the pair of arm rests are permanently fixed.

9. An airplane seat according to claim 1 in which the pair of arm rests are adjustable in a vertical direction.

10. An airplane seat according to claim 1 in which one of the pair of arm rests is fixed and the other of said pair is adjustable vertically.

11. An airplane seat according to claim 1 in which one of the pair of arm rests is removable.

12. An airplane seat according to claim 1 including at least one adjustable headrest disposed on the uppermost edge of the back member.

* * * * *